Sept. 6, 1955
R. J. KING ET AL
2,716,970
MEANS FOR DIRECTING WATER IN THE CYLINDER
HEAD OF AN INTERNAL COMBUSTION ENGINE
Filed Dec. 14, 1953
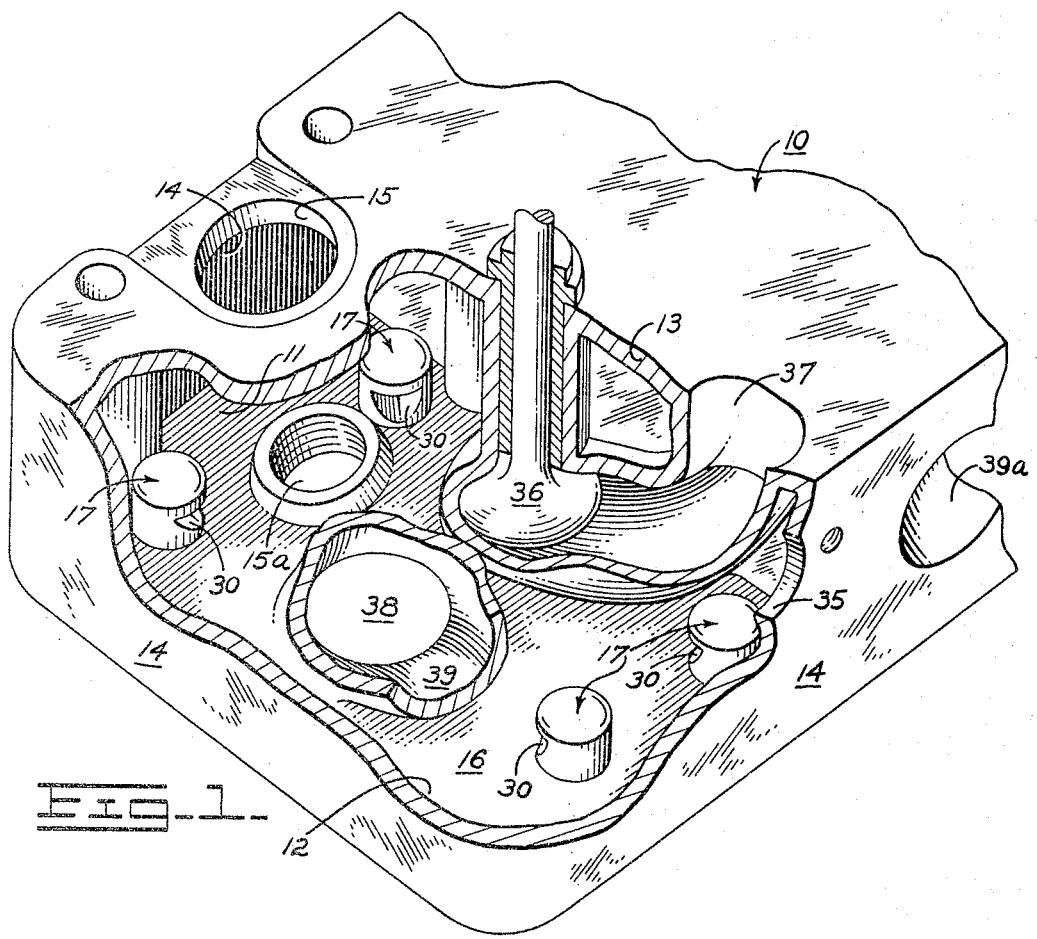
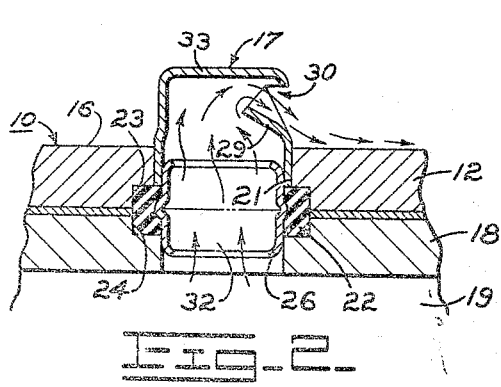
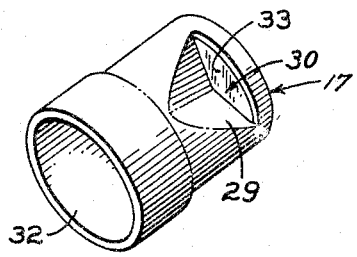
INVENTOR.
RALPH JOSEPH KING
EARL DUANE EYMAN
By Charles M. Fryer
ATTORNEY

United States Patent Office 2,716,970
Patented Sept. 6, 1955

2,716,970

MEANS FOR DIRECTING WATER IN THE CYLINDER HEAD OF AN INTERNAL COMBUSTION ENGINE

Ralph Joseph King, Peoria, and Earl Duane Eyman, Canton, Ill., assignors to Caterpillar Tractor Co., Peoria, Ill., a corporation of California Application December 14, 1953, Serial No. 397,871

3 Claims. (Cl. 123—41.73)

This invention relates generally to a cylinder head for an internal-combustion engine and specifically to the water directors retained in the water jacket of a cylinder head for furnishing a constant supply of turbulent coolant toward the deck of the cylinder sealing wall in an area adjacent to the combustion chambers of the engine.

In water directors presently in use, coolant is injected in the water jacket of the engine cylinder head, generally parallel to, or at a slightly diverging angle to the plane of the deck surface of the cylinder sealing wall. With this type of director, there is evidence that a stagnant film of water exists on the deck surface, creating hot spots in the deck in the area adjacent to the combustion chambers of the engine. Furthermore, stagnant coolant allows an accumulation of lime and other deposits, thereby further reducing the efficiency of the cooling system.

It is therefore a principal object of this invention to provide a water distributor containing a specially-shaped orifice which will direct the coolant toward the deck surface of the cylinder sealing wall within the water jacket of the cylinder head to create a turbulent flow of coolant over the critical areas of the deck and if desired toward the bottom portions thereof.

Another object of this invention is the provision of a suitable aperture in the water distributor which will direct a fan-shaped pattern of coolant toward the deck to eliminate stagnant areas of coolant and minimize lime deposits.

Further and more specific objects and advantages of this invention are made apparent in the following specifications in which reference is made to the accompanying drawings.

In the drawings:

Figure 1 is an isometric view of a portion of a cylinder head of an internal-combustion engine with a part broken away to show the details of the invention;

Figure 2 is a partial sectional view taken through one of the water distributors and its associated parts; and Figure 3 is an isometric view of one of the water directors illustrating the preferred formation of the water-directing aperture therein.

In Figure 1, a cylinder head of the type commonly associated with the engine block of an internal combustion engine is generally indicated at 10 as being hollow to provide a water jacket 11, defined by a cylinder sealing wall 12, a spaced outer wall 13, and suitable side walls 14 circumscribing the water jacket. Suitable openings 15 and 15a, the latter being threaded, are provided for the reception of a conventional pre-combustion chamber through which fuel is injected to the main combustion chamber of the engine.

Fastened to and extending upwardly from the cylinder sealing wall 12 are a plurality of water distributing members generally indicated at 17, herein disclosed as being generally tubular in structure and as having an open end 32 and a closed end 33. A specially shaped orifice generally indicated at 30 is provided in the peripheral wall of said water distributing members 17 to direct a forceful flow of coolant toward the deck surface 16 of the cylinder sealing wall 12 in the area adjacent the combustion chambers of the engine.

As seen in Figure 2 the cylinder sealing wall 12, forming a part of the cylinder head 10, is shown in the condition of assembly with the engine block 18 in an area adjacent to the engine water manifold 19.

The water distributing members 17 are assembled with the cylinder head water jacket 10 by press-fitting said distributing members 17 into suitable bores 21 formed within the cylinder sealing wall 12 of said cylinder head. A sealing grommet 22 is retained in cooperating annular counterbores 23 and 24 formed in the opposing faces of the cylinder sealing wall 12 and the engine block 18 respectively. An annular shield member 26 is provided to protect the sealing grommet 22 from the deteriorating effects of the coolant passing therethrough.

As coolant travels from the engine manifold 19, through the water distributors 17, means are provided for altering the direction of the flow of coolant so that coolant will be directed toward the deck face 16 of the cylinder sealing wall 12 and create a turbulence in the coolant in the areas adjacent to the combustion areas of the engine.

To effect this change in direction of water, the orifice 30 in distributing member 17 is partially defined by an inwardly turned baffle member 29 (see Figures 2 and 3) which functions to alter the straight-line flow of water, causing it to flow around said baffle 29 and direct the resultant jet of water against the deck surface 16 of the cylinder sealing wall 12.

To effectively flood the critical areas of the deck surface within the cylinder head water jacket, baffle member 29 is as herein disclosed a generally fan-shaped depression in the peripheral wall of the director to produce a fan-shaped jet of coolant flowing toward the areas adjacent to combustion areas of the engine. With this type of director, the deck surface 16 is continually washed with a supply of coolant to keep said deck surface free of harmful lime deposits, and eliminate a stagnant film of coolant. The water entering the cylinder head in this manner is discharged through ports, one of which is partially illustrated at 35 and then enters a manifold, not shown, by which it is directed to any suitable conventional cooling system.

Since the orifices 30 are provided on one side only of the distributors 17 they may be directionally oriented upon installation of the distributors to cause the greater flow of coolant toward the areas of greatest heat. For example, as shown in Figure 1, an intake valve is shown at 36 to communicate with the combustion chamber of the engine. Air flows to this valve through a passage 37. An exhaust valve, not shown, controls a port 38 communicating with the exterior of the head through a passage 39. Only a part of the passage 39 is shown but the outer end of a similar passage for the next cylinder appears at 39a. The area directly adjacent the exhaust valve is usually relatively hot and for this reason the distributors are, as shown, oriented to direct the greater flow of coolant toward this area.

We claim:

1. In an internal-combustion engine, a cylinder head containing a water jacket and a cylinder sealing wall, means on said cylinder sealing wall within said water jacket comprising a plurality of water directing members, said members each having an orifice forming an elongated throat in its peripheral wall, said orifice having a baffle extending inwardly of the member to direct the flow of coolant into a fan shaped pattern against the cylinder sealing wall adjacent the combustion areas of said engine.

2. In an internal combustion engine having a cylinder head containing a water jacket including a cylinder sealing wall, a plurality of water directing members projecting into the water jacket to admit water under pressure through said wall, each of said members having a closed end and an orifice in a portion perpendicular to said wall, and having a baffle projecting into the member adjacent said orifice to cooperate with said closed end in directing water from the orifice against the wall.

3. In an internal combustion engine having a cylinder head containing a coolant jacket including a cylinder sealing wall, a plurality of coolant directing members projecting into the jacket to admit coolant under pressure through said wall, each of said members comprising a tubular part with a closed end and an orifice in its wall, the orifice being defined by a straight upper edge and a lower edge projecting inwardly of the member to provide a baffle and induce flow of coolant through the orifice away from the closed end and against the cylinder sealing wall.

References Cited in the file of this patent

UNITED STATES PATENTS

| | | |
|---|---|---|
| 1,245,578 | Fulscher | Nov. 6, 1917 |
| 1,793,713 | Morrill | Feb. 24, 1931 |
| 1,915,104 | Ruehl | June 20, 1933 |
| 2,305,475 | Jagersberger et al. | Dec. 15, 1942 |
| 2,458,447 | Tacchella | Jan. 4, 1949 |